(12) United States Patent
Runde et al.

(10) Patent No.: US 9,399,420 B2
(45) Date of Patent: Jul. 26, 2016

(54) ELECTROMECHANICAL RETRACTABLE HEAD RESTRAINT

(71) Applicants: David M Runde, Beverly Hills, MI (US); Rodney J Dalgord, Highland, MI (US)

(72) Inventors: David M Runde, Beverly Hills, MI (US); Rodney J Dalgord, Highland, MI (US)

(73) Assignee: Magna Seating Inc., Aurora, Ontario (CA)

(*) Notice: Subject to any disclaimer, the term of this patent is extended or adjusted under 35 U.S.C. 154(b) by 0 days.

(21) Appl. No.: 14/225,895

(22) Filed: Mar. 26, 2014

(65) Prior Publication Data

US 2014/0292057 A1  Oct. 2, 2014

Related U.S. Application Data

(60) Provisional application No. 61/805,282, filed on Mar. 26, 2013, provisional application No. 61/836,185, filed on Jun. 18, 2013.

(51) Int. Cl.
| | | |
|---|---|---|
| *A47C 1/10* | (2006.01) | |
| *B60N 2/48* | (2006.01) | |
| *B60N 2/00* | (2006.01) | |
| *B60N 2/02* | (2006.01) | |

(52) U.S. Cl.
CPC .............. *B60N 2/4829* (2013.01); *B60N 2/002* (2013.01); *B60N 2/482* (2013.01); *B60N 2/4832* (2013.01); *B60N 2002/024* (2013.01); *B60N 2002/0236* (2013.01); *B60N 2002/4891* (2013.01)

(58) Field of Classification Search
CPC .... B60N 2/002; B60N 2/4829; B60N 2/4808; B60N 2/4811

USPC .......................................................... 297/410
See application file for complete search history.

(56) References Cited

U.S. PATENT DOCUMENTS

| | | | | |
|---|---|---|---|---|
| 3,738,706 A | * | 6/1973 | Caldemeyer | A47C 7/38 297/362 |
| 4,645,233 A | | 2/1987 | Bruse et al. | |
| 4,923,250 A | * | 5/1990 | Hattori | B60N 2/4829 297/408 |
| 5,131,720 A | * | 7/1992 | Nemoto | B60N 2/4829 297/391 |
| 5,390,982 A | * | 2/1995 | Johnson | B60N 2/4876 297/410 |
| 5,748,473 A | * | 5/1998 | Breed | B60N 2/002 180/273 |
| 6,330,501 B1 | * | 12/2001 | Breed | B60N 2/002 180/273 |
| 6,364,415 B1 | * | 4/2002 | Mori | B60N 2/4817 297/410 |
| 6,390,558 B2 | * | 5/2002 | Fischer | B60N 2/20 297/378.12 |
| 6,543,852 B2 | * | 4/2003 | Mori | B60N 2/0224 297/410 |
| 6,573,673 B1 | | 6/2003 | Hampel et al. | |

(Continued)

*Primary Examiner* — Laurie K Cranmer
(74) *Attorney, Agent, or Firm* — Miller Canfield

(57) ABSTRACT

A seat assembly comprises a seat cushion and a seat back having a bottom portion coupled to the seat cushion and an opposite top portion. A head restraint is coupled to the seat back for movement between a stowed position adjacent the top portion of the seat back and a deployed position spaced above the top portion of the seat back. A cable carriage is coupled to the seat back for actuation along a longitudinal axis between a home position and a lift position. A cable extends between a first end coupled to the head restraint and a second end coupled to the cable carriage for moving the head restraint between the stowed position and the deployed position in response to actuation of the cable carriage between the home position and the lift position.

12 Claims, 9 Drawing Sheets

(56) References Cited

U.S. PATENT DOCUMENTS

| | | | |
|---|---|---|---|
| 7,145,263 B2 * | 12/2006 | Nathan | B60N 2/002 180/271 |
| 7,210,734 B1 | 5/2007 | Yetukuri et al. | |
| 7,367,626 B2 * | 5/2008 | Lawall | B60N 2/42781 297/216.12 |
| 7,445,290 B2 * | 11/2008 | Kopetzky | A47C 7/38 297/410 |
| 7,878,596 B2 * | 2/2011 | Brunner | B60N 2/4832 297/378.12 |
| 7,967,377 B2 | 6/2011 | Truckenbrodt et al. | |
| 8,061,777 B2 * | 11/2011 | Jensen | B60N 2/20 297/378.12 |
| 8,235,416 B2 | 8/2012 | Breed et al. | |
| 8,272,696 B2 * | 9/2012 | Hong | B60N 2/4829 297/391 |
| 8,276,983 B2 * | 10/2012 | Tame | B60N 2/3013 297/410 |
| 2009/0045661 A1 | 2/2009 | Stoessel et al. | |
| 2012/0041648 A1 | 2/2012 | Yamaguchi et al. | |

* cited by examiner

US 9,399,420 B2

ELECTROMECHANICAL RETRACTABLE HEAD RESTRAINT

CROSS-REFERENCE TO RELATED APPLICATIONS

This application claims priority to and all the benefits of U.S. Provisional Application Nos. 61/805,282, filed Mar. 26, 2013 and 61/836,185, filed Jun. 18, 2013. All applications are incorporated herein by reference in their entireties.

BACKGROUND OF THE INVENTION

1. Field of the Invention

The present invention relates to a head restraint for a vehicle seat assembly that is automatically retractable between a deployed position and a stowed position. More particularly, the present invention relates to an electromechanical retractable head restraint operatively coupled to a seat back of the seat assembly for actuation between the stowed position lowered against the top of the seat back and the deployed position raised above the seat back in response to the presence of an occupant seated in the seat assembly.

2. Description of Related Art

Automotive vehicles typically include one or more seat assemblies having a seat cushion and a seat back for supporting passengers above a vehicle floor. The seat assembly is commonly mounted to the vehicle floor by a seat track assembly for providing fore and aft adjustment of the seat assembly for passenger comfort. The seat back is typically pivotally coupled to the seat cushion by a recliner assembly for providing pivotal adjustment of the seat back relative to the seat cushion.

The seat assembly also includes a head restraint coupled to the top of the seat back for supporting the seat occupant's head. The head restraint is typically slidably coupled to the seat back and either power actuated or manually actuated between a stowed position lowered against the top of the seat back and a deployed position raised above the top of the seat back. It is desirable to actuate the head restraint to the deployed position when an occupant is seated in the seat to properly support the seat occupant's head. However, when an occupant is not seated in the seat, the deployed head restraint can impinge upon the view through the rear of the vehicle, and therefore, it is desirable to retract the head restraint to the stowed position.

However, it is not efficient or practical to manually retract the head restraint to the stowed position in every instance that an occupant vacates the seat assembly. Therefore, it is desirable to provide a head restraint which is automatically actuated between the stowed and deployed positions in response to the presence of an occupant seated within the seat which is detected by an occupant detection sensor in the seat cushion.

SUMMARY OF THE INVENTION

According to one aspect of the invention, a seat assembly is provided comprising a seat cushion and a seat back having a bottom portion coupled to the seat cushion and an opposite top portion. A head restraint is operatively coupled to the seat back for movement between a stowed position adjacent the top portion of the seat back and a deployed position spaced above the top portion of the seat back. A cable carriage is operatively coupled to the seat back for actuation along a longitudinal axis between a home position and a lift position. A cable extends between a first end coupled to the head restraint and a second end coupled to the cable carriage for moving the head restraint between the stowed position and the deployed position in response to actuation of the cable carriage between the home position and the lift position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
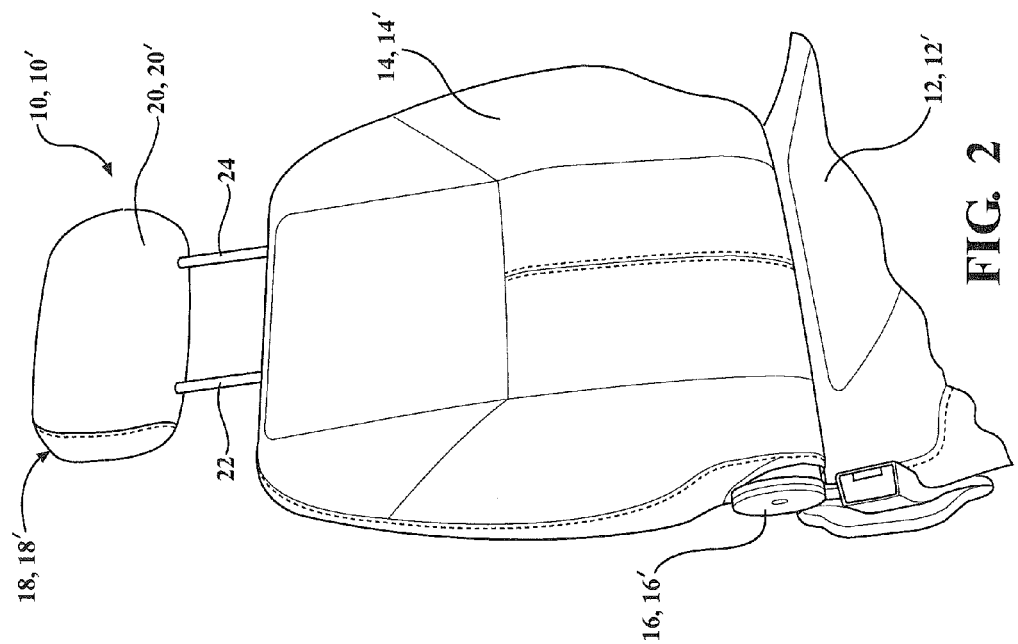
FIG. 1 is a perspective view of a seat assembly with a head restraint in a stowed position.
Figure 2:
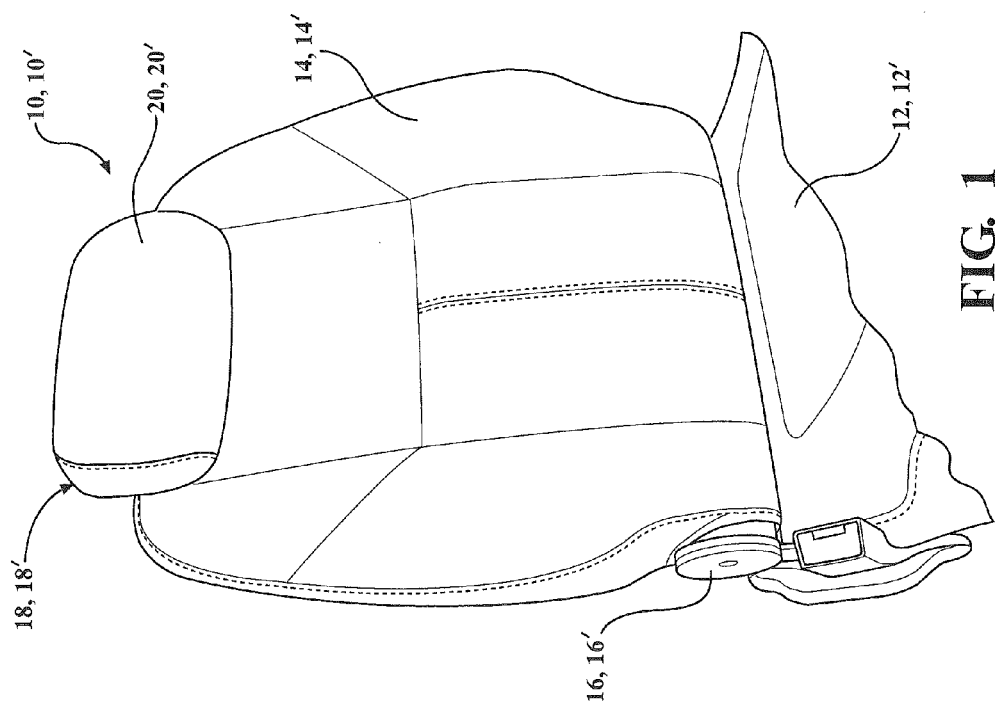
FIG. 2 is a perspective view of the seat assembly with the head restraint in a deployed position.

Referring to the Figures, wherein like numerals indicate like or corresponding parts throughout the several views, a seat assembly for use in an automotive vehicle is generally shown at 10. Referring to FIGS. 1 and 2, the seat assembly 10 includes a generally horizontal seat cushion 12 and a generally upright seat back 14 operatively and pivotally coupled by a recliner assembly 16 to the seat cushion 12. The seat assembly 10 includes an electromechanical retractable head restraint assembly 18 operatively coupled to the top of the seat back 14 for actuation between a stowed position retracted against the top of the seat back 14, as shown in FIG. 1, and a deployed position spaced above the top of the seat back 14, as shown in FIG. 2. The head restraint assembly 18 includes a head restraint body 20, as is commonly known in the art, comprised of a support frame covered in a foam pad and encased in a fabric trim cover. A pair of head restraint posts 22, 24 extends downwardly from the head restraint body 20 for slidably coupling the head restraint assembly 18 to the seat back 14.

Referring to FIGS. 3-6, an electromechanical retractable head restraint assembly 18 according to a first embodiment is shown. The seat back 14 includes a seat back frame 26 defined by a pair of spaced apart upright side frames 28, 30 each having a bottom end pivotally coupled to the seat cushion 12 by the recliner assembly 16 and a top end interconnected by a top cross frame 34. A bottom plate 32 is attached adjacent to the recliner assembly 16 to support the lower portion of the seat back 14. The top cross frame 34 includes a pair of cylindrical guide sleeves 36, 38 extending therethrough for slidably receiving the head restraint posts 22, 24 therethrough, respectively, and guiding the head restraint 18 between the stowed and deployed positions. The distal ends of the head restraint posts 22, 24 are interconnected by a lateral bracket 40. A head restraint latch and actuator is schematically shown at 42 and is operatively coupled to one of the head restraint posts 22, 24 for selectively latching the head restraint 18 in the stowed and deployed positions as is commonly known in the art.

Figure 3:
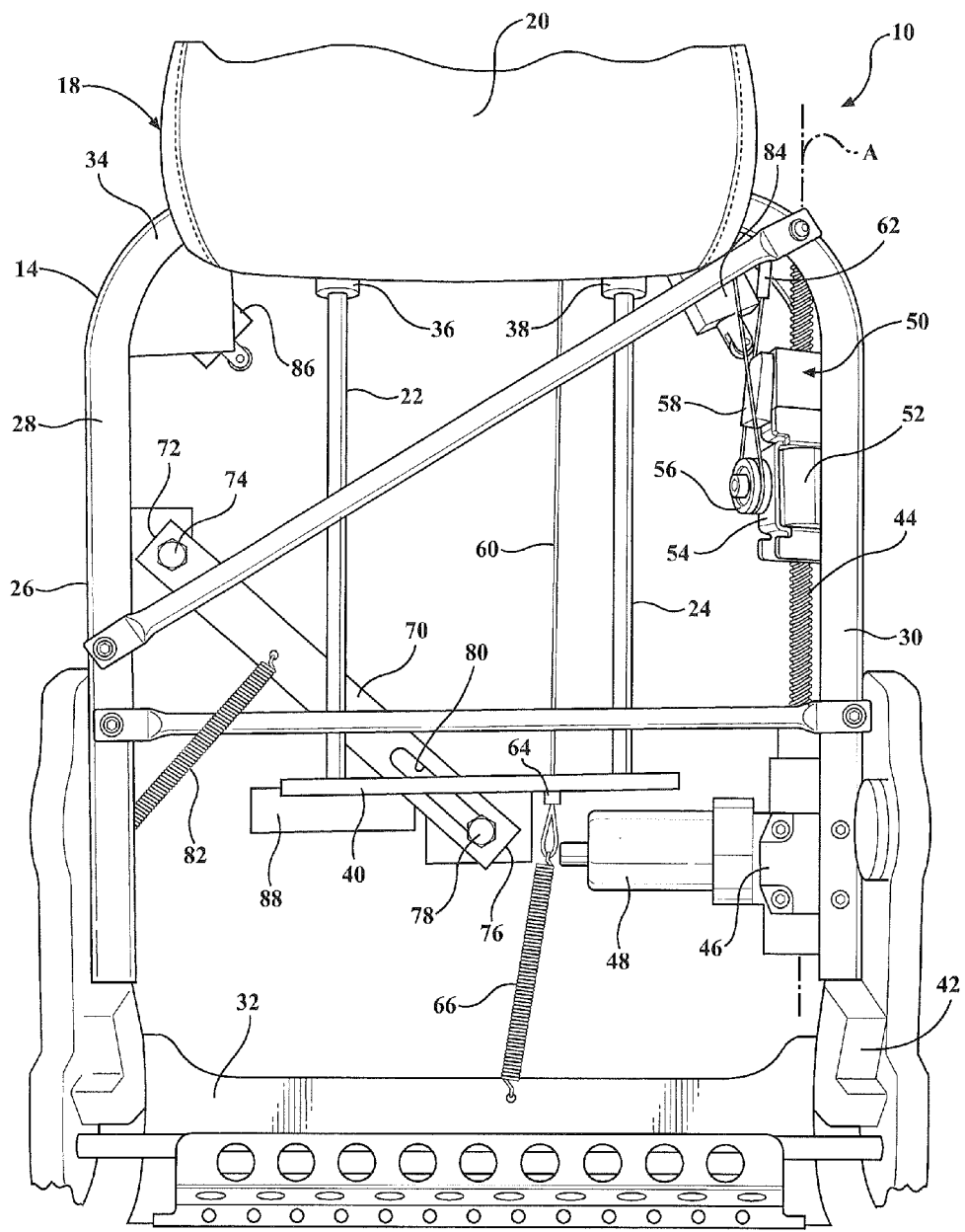
FIG. 3 is fragmentary front view of a seat back of the seat assembly with an electromechanical retractable head restraint according to one embodiment of the invention in the stowed position.
Figure 4:
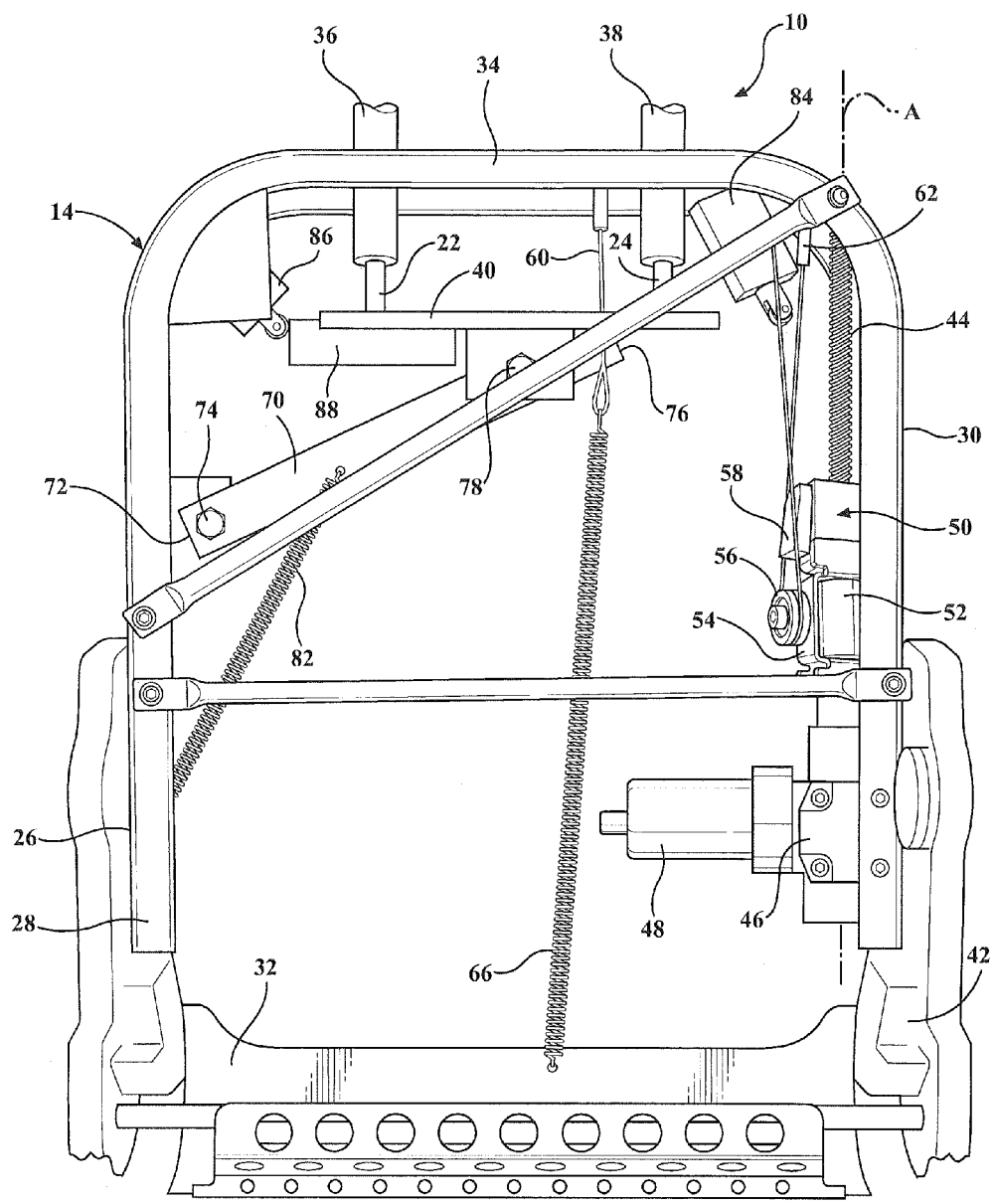
FIG. 4 is a fragmentary front view of the seat back with the electromechanical retractable head restraint in the deployed position.

A cylindrical threaded drive screw 44 is rotatably coupled to one of the side frames 28, 30 of the seat back frame 26. The drive screw 44 extends longitudinally along the length of the side frame 28, 30 between a proximal end adjacent the bottom plate 32 and a distal end adjacent the top cross frame 34 and defining an axis A. The proximal end of the drive screw 44 is coupled to a gear box 46 also fixedly secured to the side frame 28, 30 adjacent the bottom plate 32. An electric motor 48 is coupled to the gear box 46 for driving and rotating the drive screw 44 in either the clockwise or counterclockwise direction. A cable carriage 50 is operatively coupled to the drive screw 44 for linear movement along the axis A in response to rotation of the drive screw in the clockwise or counterclockwise direction between a home position adjacent the distal end, as shown in FIG. 3, and a lift position adjacent the gear box 46 and motor 48, as shown in FIG. 4. The cable carriage 50 includes a drive nut 52 threadedly coupled to the drive screw 44, a generally U-shaped bracket 54 extending laterally from each end of the drive nut 52, a pulley wheel 56 rotatably mounted to the bracket 54, and a first switch block 58, such as a mechanical limit switch, fixedly mounted to the bracket 54.

A cable 60 extends between a first end 62 fixedly secured to the top cross frame 34 and a second end 64 operatively coupled to the lateral bracket 40. A portion of the cable 60 between the first 62 and second 64 ends is wound about the pulley wheel 56 extending from the cable carriage 50. A first coil spring 66 extends between the bottom plate 32 and the second end 64 of the cable 60 for biasing the cable 60 towards the bottom plate 32 and maintaining tension along the length of the cable 60 when the head restraint 18 is in the deployed position and the cable carriage 50 is in the home position.

An elongated return link 70 extends between a first end 72 pivotally coupled to one of the side frames 28, 30 (opposite the side frame 28, 30 supporting the drive screw 44) by first pivot pin 74 and an opposite second end 76 pivotally coupled to the lateral bracket 40 by second pivot pin 78. The return link 70 includes an elongated guide slot 80 adjacent the second end 74 for slidably receiving and guiding the second pivot pin 78 therealong as the head restraint 18 moves between the stowed and deployed positions. A second coil spring 82 extends between the side frame 28, 30 and the return link 70 approximately midway between the first and second ends 72, 76 for biasing the return link in the clockwise direction as viewed in FIG. 3 and thus biases the head restraint 18 towards the stowed position.

Additionally, a first carriage proximity switch 84 is fixedly mounted to the top cross frame 34 adjacent the side frame 30 for contact with the first switch block 58 on the cable carriage and a second bracket proximity switch 86 is fixedly mounted to the top cross frame 34 adjacent the side frame 28 for contact with a second switch block 88 extending from the lateral bracket 40.

Figure 6:
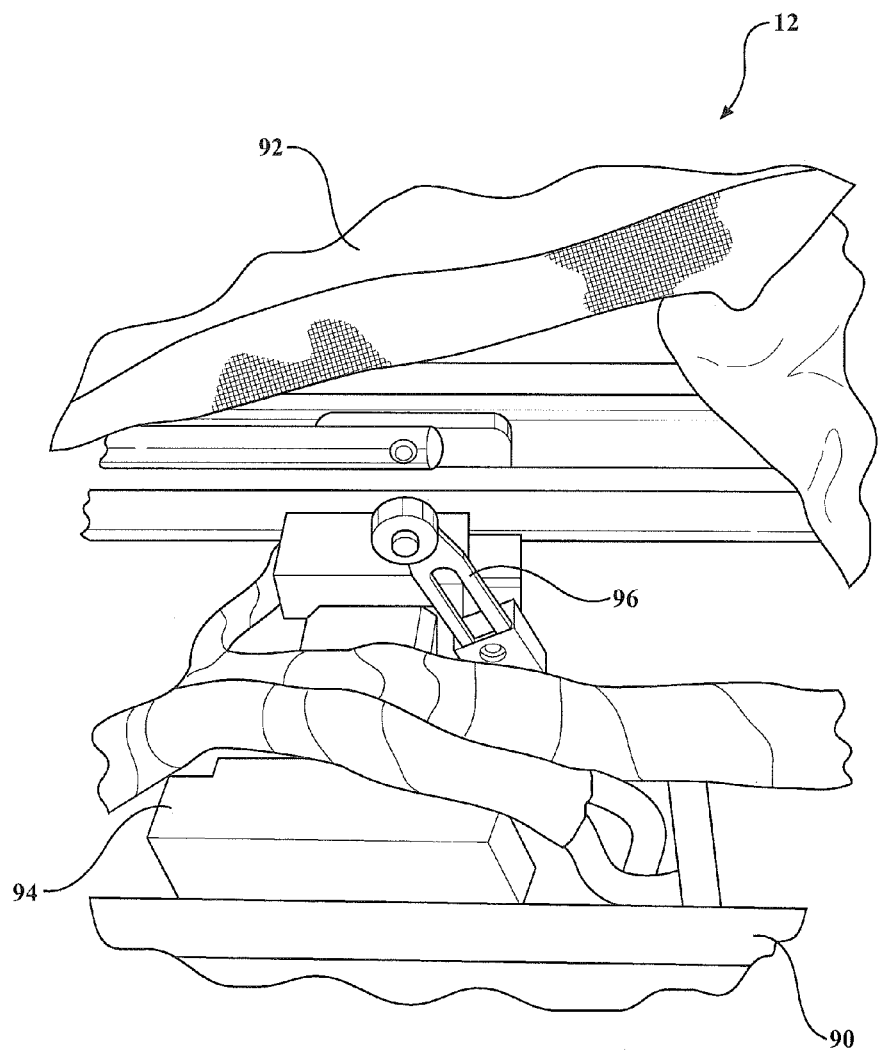
FIG. 6 is fragmentary perspective view of a seat cushion of the seat assembly having an occupant detection system and mechanical override switch.

Finally, referring to FIG. 6, the seat cushion 12 includes a seat cushion frame 90 for supporting the seat back frame 26 and mounting the seat assembly 10 to the floor of an automotive vehicle. The seat cushion frame 90 supports a resilient foam pad encased by a fabric trim cover (shown collectively at 92) for supporting an occupant in the seat assembly 10. The seat cushion 12 further includes an occupant detection system (ODS), shown schematically at 94, mounted to the seat cushion frame 90 underneath the foam pad and trim cover 92 for detecting an occupant seated on the seat cushion 12. Occupant detection systems 94 are readily available and well known to one skilled in the art. Further, a mechanical override switch 96 is also mounted to the seat cushion frame 90 underneath the foam pad and trim cover 92, which is actuated by an occupant seated on the seat cushion 12 independent of the occupant detection system 94, the operation of which will be described in further detail below.

In operation, referring to FIG. 3, the head restraint 18 is shown in the stowed position lowered against the top of the seat back 14 and the seat assembly 10 is unoccupied by a seat occupant. In the stowed position, the cable carriage 50 is in the home position adjacent the top cross frame 34 of the seat back frame 26. If an occupant occupies the seat assembly 10, the ODS 94 detects the presence of the occupant and the mechanical override switch 96 is actuated. The ODS 94 then actuates the electric motor 48 to drive the drive screw 44. Rotation of the drive screw 44 in a first direction, clockwise for example, drives the threaded drive nut 52 along the axis A and length of the drive screw 44. The drive nut 52 drives the cable carriage 50 from the home position downwardly toward the lift position. Since the cable 60 is wrapped around the pulley wheel 56, the cable carriage 50 pulls on the cable 60 and shortens the effective length of the cable 60. The second end 64 of the cable 60 is connected to the lateral bracket 40 thus raising the lateral bracket 40 and sliding the head restraint 18 from the stowed position to the deployed position raised above the top of the seat back 14 as shown in FIG. 4. Once the second switch block 88 on the lateral bracket 40 engages the bracket proximity switch 86, the power is shut off from the electric motor 48 and the head restraint latch and actuator 42 latches the head restraint 18 in the deployed position.

Figure 5:
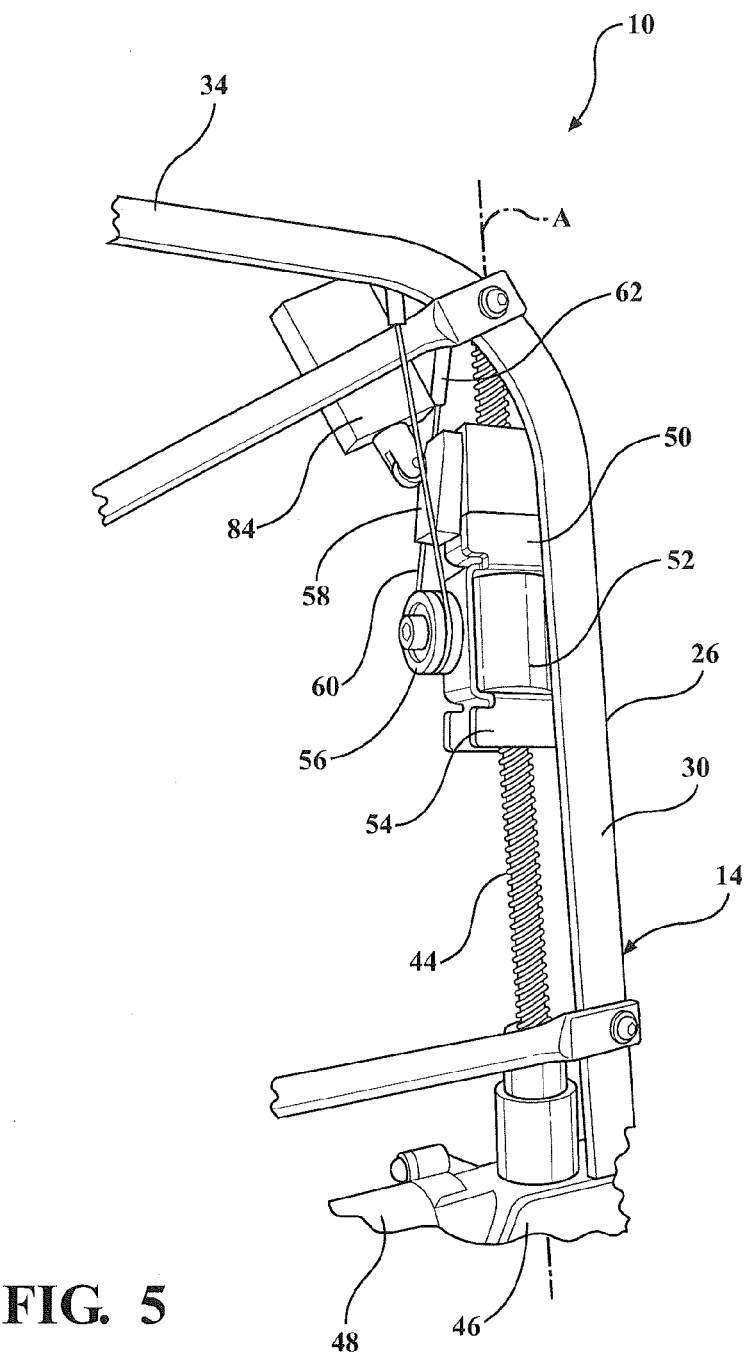
FIG. 5 is a fragmentary perspective view of a cable carriage and proximity switch with the head restraint in the deployed position.

Referring to FIGS. 4 and 5, with the head restraint 18 in the deployed position, the ODS 94 then actuates the electric motor 48 to drive the drive screw 44 in an opposite second direction, counterclockwise for example, to drive the cable carriage 50 back to the home position. In the home position, the first switch block 58 on the cable carriage 50 contacts the carriage proximity switch 84 to shut off the power to the motor 48.

Once the occupant vacates the seat assembly 10, the head restraint 18 may be returned to the stowed position via the spring biased return link 70 by one or more of the following conditions. First, the ODS 94 senses the lack of occupancy and after a predetermined delay time can again actuate the head restraint latch and actuator 42 to unlatch the head restraint 18 in the deployed position. Once the head restraint latch and actuator 42 is unlatched, the second coil spring 82 biases the return link 70 clockwise to slide the lateral bracket 40, and thus the head restraint 18 downwardly from the deployed position to the stowed position. The guide slot 80 in the return link 70 allows the linear movement of the head restraint 82 between the deployed and stowed position in response to the pivotal movement of the return link 70. Second, the head restraint latch and actuator 42 may be remotely unlatched by an operator such as by a button within the vehicle or by a strap or latch on the seat 10. And finally, the head restraint latch and actuator 42 may be unlatched by an internal trigger in response to the seat back 14 pivoting from the upright seating position to a fold flat position overlying the seat cushion 12 as is commonly known in the art.

It should further be appreciated that the head restraint 18 will not stow with an occupant in the seat regardless of the signal by the ODS due to actuation of the mechanical override switch 96. Further, it should also be appreciated that the head restraint 18 can be raised manually if desired for child seat or booster seat installation or other needs.

Referring now to FIGS. 7-10, an alternative embodiment of the electromechanical retractable head restraint is shown at 18'. The seat back 14' similarly includes a seat back frame 26' defined by a pair of spaced apart upright side frames 28', 30' each having a bottom end pivotally coupled to the seat cushion 12' by the recliner assembly 16' and an opposite top end interconnected by a top cross frame 34'. The top cross frame 34' includes a pair of cylindrical guide sleeves 36', 38' extending therethrough for slidably receiving the head restraint posts 22', 24' therethrough, respectively, and guiding the head restraint 18' between the stowed and deployed positions. A head restraint latch and actuator is schematically shown at 42' and is operatively coupled to one of the head restraint posts 22', 24' for selectively latching the head restraint 18' in the stowed and deployed positions as is commonly known in the art.

Figure 7:
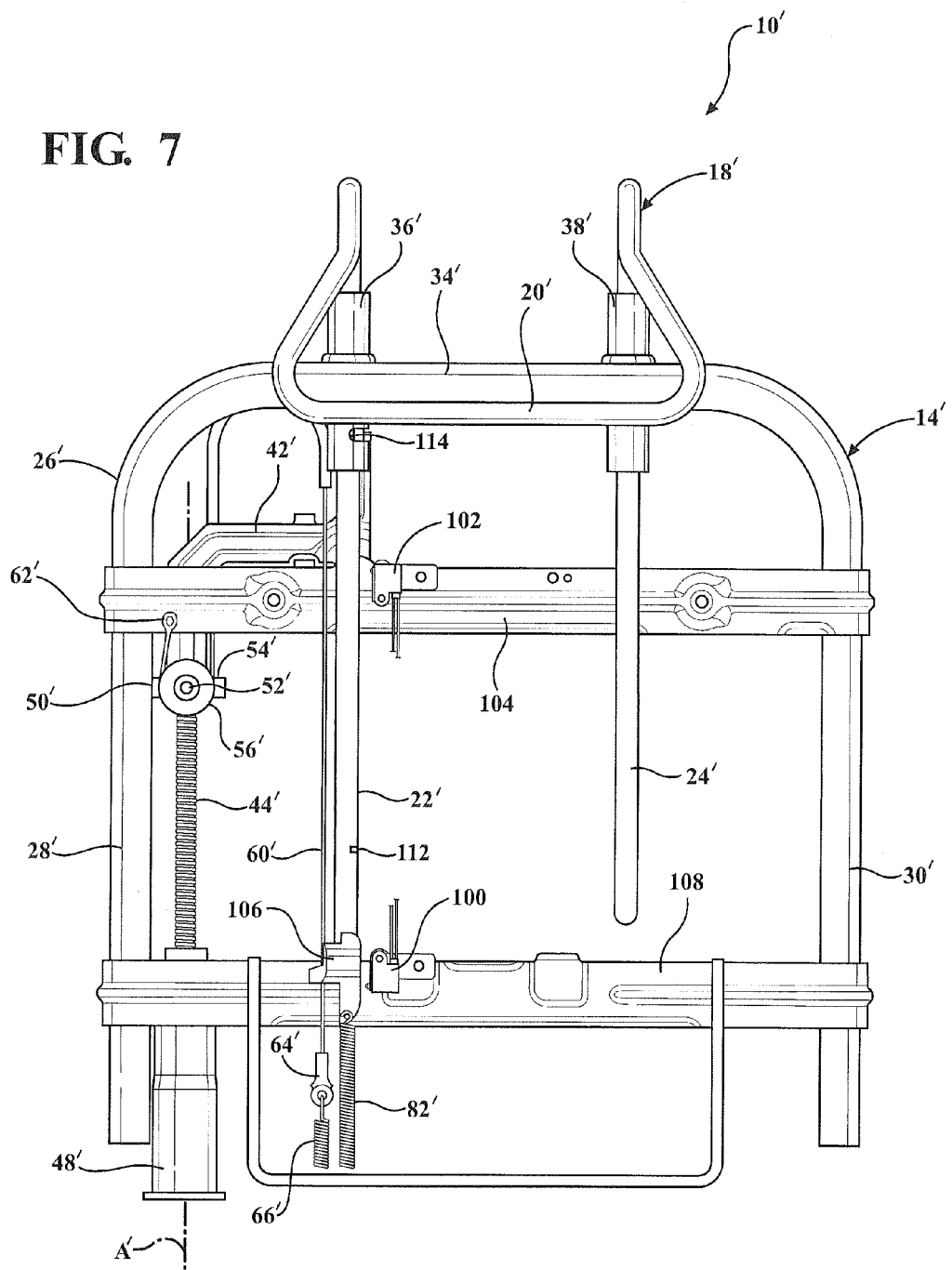
FIG. 7 is a front view of the seat assembly with an electromechanical retractable head restraint according to an alternative embodiment of the invention in the stowed position.
Figure 8:
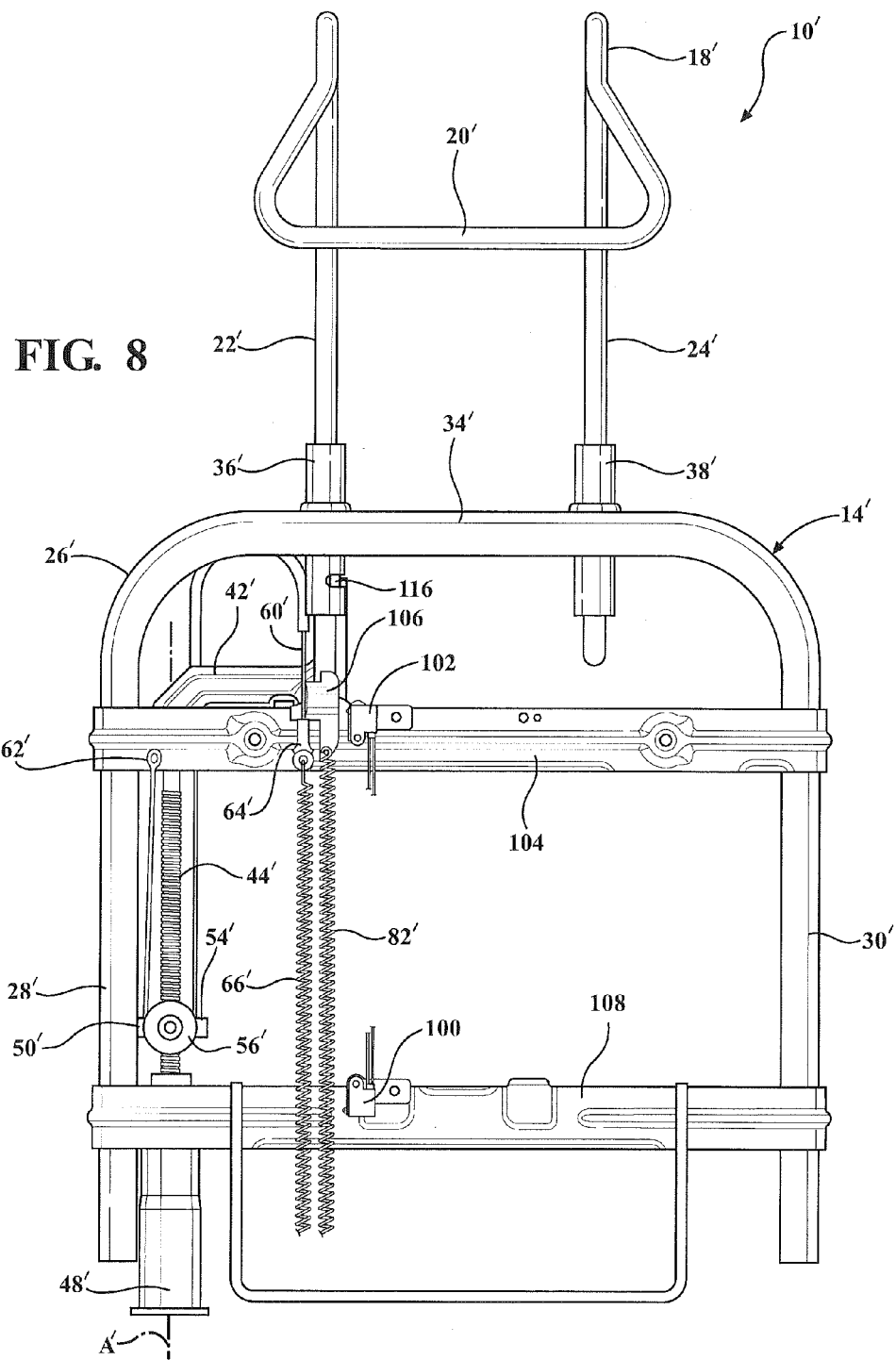
FIG. 8 is front view of the electromechanical retractable head restraint of FIG. 7 in the deployed position.

A cylindrical threaded drive screw 44' is rotatably coupled to one of the side frames 28', 30' of the seat back frame 26'. The drive screw 44' extends longitudinally along the length of the side frame 28', 30' between a proximal end and a distal end adjacent the top cross frame 34' and defining an axis A'. The proximal end of the drive screw 44' is coupled to an electric motor 48' integrated with a gear box and controller for driving and rotating the drive screw 44' in either the clockwise or counterclockwise direction. A cable carriage 50' is operatively coupled to the drive screw 44' for linear movement along the axis A' in response to rotation of the drive screw in the clockwise or counterclockwise direction between a home position adjacent the distal end, as shown in FIG. 7, and a lift position adjacent motor 48', as shown in FIG. 8. The cable carriage 50' includes a drive nut 52' threadedly coupled to the drive screw 44', a bracket 54', and a pulley wheel 56' rotatably mounted to the bracket 54'. It should be appreciated that the drive nut 52' and the bracket 54' can be combined into one part with changing the scope of the invention.

Additionally, a first micro switch 100 is fixedly mounted to a lower cross frame 108 adjacent the head restraint post 22' and a second micro switch 102 is fixedly mounted to a mid-cross frame 104 adjacent the same head restraint post 22'. A switch block 106 is secured to the distal end of the head restraint post 22' for contacting and actuating each of the first and second micro switches 100, 102 when the head restraint 18' is in the stowed and deployed positions, respectively. A cable 60' extends between a first end 62' fixedly secured to the mid-cross frame 104 and a second end 64' operatively coupled to the switch block 106. A portion of the cable 60' between the first 62' and second 64' ends is wound about the pulley wheel 56' extending from the cable carriage 50'. A first coil spring 66' extends between the bottom plate 32' (not shown) and the second end 64' of the cable 60' for biasing the cable 60' towards the bottom plate 32' and maintaining tension along the length of the cable 60' when the head restraint 18' is in the deployed position and the cable carriage 50' is in the home position. Finally, a second coil spring 82' extends between the switch block 106 and the bottom plate 32' (not shown) for biasing the head restraint 18' to the stowed position.

The operation of the head restraint 18' of the second embodiment is similar to the operation described above for the first embodiment except the first and second micro switches 100, 102 are engaged by the switch block 106 in each of the stowed and deployed positions to control actuation of the head restraint latch and actuator 42', the motor 48' and thus movement of the cable carriage 50' between the home and lift positions. More specifically, in the stowed position, the cable carriage 50' is in the home position adjacent the mid-cross frame 104 of the seat back frame 26'. If an occupant occupies the seat assembly 10, the ODS 94 detects the presence of the occupant. The ODS 94 then actuates the electric motor 48' to drive the drive screw 44'. Rotation of the drive screw 44' in a first direction, clockwise for example, drives the threaded drive nut 52' along the axis A' and length of the drive screw 44'. The drive nut 52' drives the cable carriage 50' from the home position downwardly toward the lift position. Since the cable 60' is wrapped around the pulley wheel 56', the cable carriage 50' pulls on the cable 60' and shortens the effective length of the cable 60'. The second end 64' of the cable 60' is also coupled to the switch block 106, thus raising the head restraint 18' from the stowed position to the deployed position raised above the top of the seat back 14' as shown in FIG. 8. Once the switch block 106 engages the second micro switch 102, the power is shut off to electric motor 48' and the head restraint latch and actuator 42' latch the head restraint 18' in the deployed position.

Figure 9:
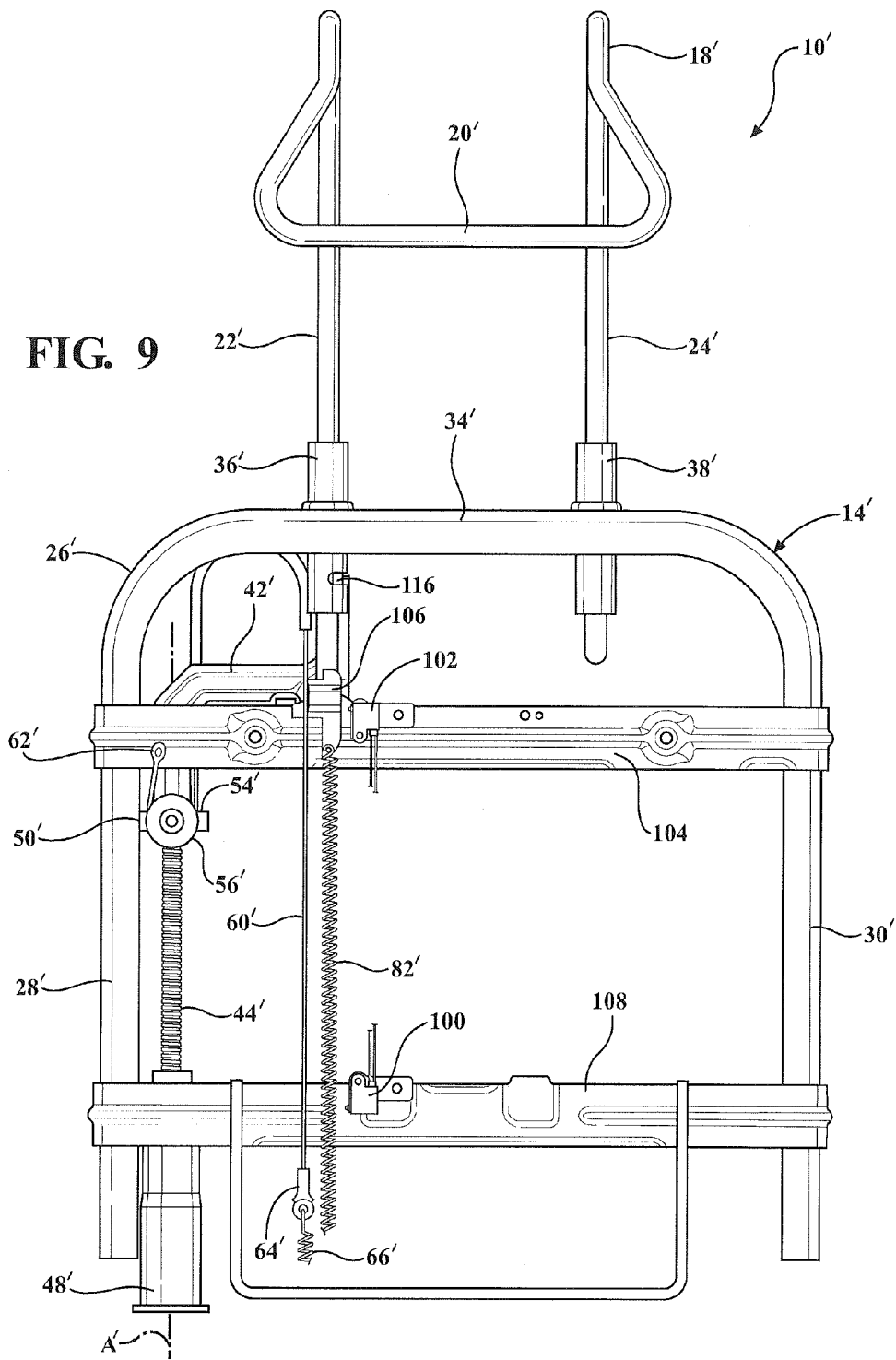
FIG. 9 is a front view of the electromechanical retractable head restraint of FIG. 7 in the deployed position and the cable carriage in the home position.

Referring to FIGS. 8 and 9, with the head restraint 18' in the deployed position, the ODS 94 then actuates the electric motor 48' to drive the drive screw 44' in an opposite second direction, counterclockwise for example, to drive the cable carriage 50' back to the home position. The amount of rotation of the electric motor 48' to cause this movement is controlled by a hall effect sensor, as is commonly known.

Figure 10:
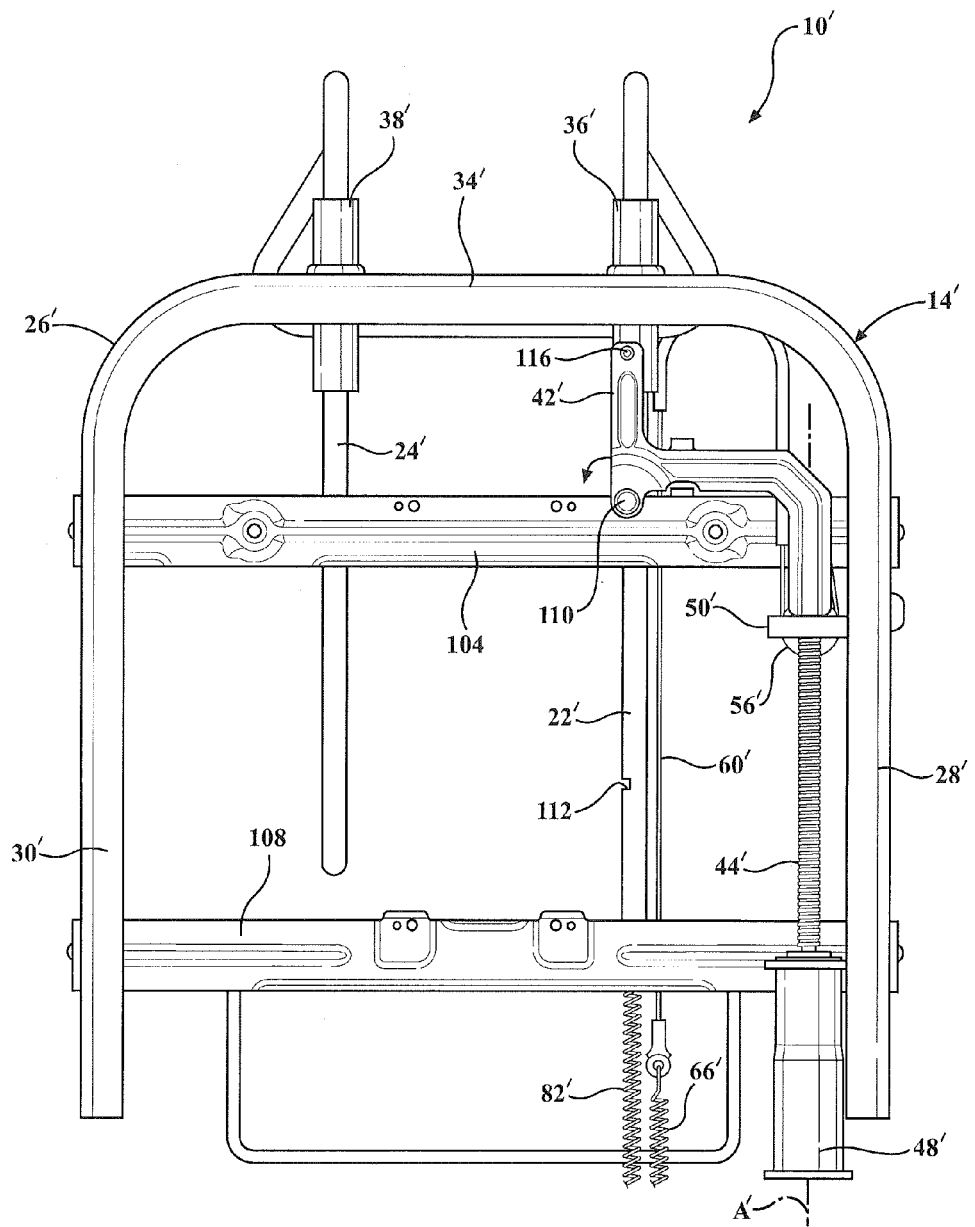
FIG. 10 is a rear view of the electromechanical retractable head restraint of FIG. 7 in the stowed position with a head restraint latch in a latched condition.

Once the occupant vacates the seat assembly 10', the head restraint 18' may be returned to the stowed position by one or more of the following conditions. First, the ODS 94 senses the lack of occupancy and after a predetermined delay time can again actuate the head restraint latch and actuator 42' to unlatch the head restraint 18' in the deployed position. In order to unlatch the head restraint 18', the electric motor 48' drives the drive screw 44' in the opposite second direction an additional amount. This causes the cable carriage 50' to travel further upward above the home position. This additional travel causes the head restraint latch and actuator 42' to rotate about pivot 110 and unlatch the head restraint 18'. More specifically, as shown in FIG. 10, the head restraint post 22' includes at least one notch 112 recessed therein along its longitudinal length for alignment with a corresponding notch 114 in the head restraint guide sleeve 36' in either the stowed or deployed positions. A pin 116 projects from a portion of the latch 42' spaced above the pivot 110 and is received in the notches 112, 114 to latch and retain the head restraint post 22' in the stowed or deployed position. The upward travel of the cable carriage 50' above the home position causes the latch 42' to pivot counterclockwise as shown in FIG. 10 to remove the pin 116 from the notches 112, 114 and unlatch the head restraint post 22' to allow movement between the stowed and deployed positions. After unlatching the head restraint 18', the cable carriage 50' returns to the home position. Once the head restraint latch and actuator 42' is unlatched, the second coil spring 82' biases the head restraint 18' downwardly from the deployed position to the stowed position. Second, the head restraint latch and actuator 42' may be remotely unlatched by an operator such as by a button within the vehicle or by a strap or latch on the seat 10' as is commonly known in the art. And finally, the head restraint latch and actuator 42' may be unlatched by an internal trigger in response to the seat back 14' pivoting from the upright seating position to a fold flat position overlying the seat cushion 12' as is commonly known in the art.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A seat assembly comprising:
   a seat cushion;
   a seat back having a bottom portion coupled to said seat cushion and an opposite top portion;
   a head restraint operatively coupled to said seat back for movement between a stowed position adjacent said top portion of said seat back and a deployed position spaced above said top portion of said seat back;
   a cable carriage operatively coupled to said seat back for actuation along a longitudinal axis between a home position and a lift position; and
   a cable extending between a first end operatively coupled to said head restraint and a second end fixedly coupled to said seat back, said cable carriage operatively coupled to said cable between said first and second ends for changing the effective length of said cable upon said actuation thereof along said longitudinal axis for moving said head restraint between said stowed position and said deployed position in response to actuation of said cable carriage between said home position and said lift position.

2. The seat assembly as set forth in claim 1 further including a spring coupled between said head restraint and one of said seat cushion and said seat back for biasing said head restraint toward said stowed position.

3. The seat assembly as set forth in claim 2 wherein said head restraint includes a body portion and at least one post supporting said body portion and slidably coupled to said top portion of said seat back.

4. The seat assembly as set forth in claim 3 further including a drive screw coupled to said seat back and defining said longitudinal axis for actuating said cable carriage between said home and lift positions.

5. The seat assembly as set forth in claim 4 further including a motor operatively coupled to said drive screw for rotating said drive screw in opposite first and second directions.

6. The seat assembly as set forth in claim 5 wherein said cable carriage includes a drive nut threadedly coupled to said drive screw for driving said cable carriage between said home and lift positions in response to rotation of said drive screw in said first and second directions and a pulley operatively coupled to said cable between said first and second ends thereof for changing said effective length of said cable upon actuation of said cable carriage long said longitudinal axis of said drive screw.

7. The seat assembly as set forth in claim 6 further including a head restraint latch and actuator for selectively latching said head restraint in at least one of said stowed and deployed position.

8. The seat assembly as set forth in claim 7 further including an occupant detection sensor operatively coupled to said seat cushion for detecting the presence of an occupant in said seat assembly and actuating said cable carriage to drive said head restraint between said stowed and deployed positions.

9. The seat assembly as set forth in claim 8 further including a switch block fixedly secured to said post of said head restraint for operatively coupling said cable to said head restraint.

10. The seat assembly as set forth in claim 9 further including a first switch coupled to said seat back for engaging said switch block on said head restraint to detect the position of said head restraint in at least one of said deployed and stowed positions.

11. The seat assembly as set forth in claim 10 further including a second switch couple to said seat back and spaced from said first switch for engaging said switch block on said head restraint to detect the position of said head restraint in the other of said deployed and stowed positions.

12. The seat assembly as set forth in claim 11 further including a cable spring coupled between one end of said cable and one of said seat cushion and said seat back for maintaining tension on said cable between said first and second ends.

\* \* \* \* \*